(12) United States Patent
Cheng (10) Patent No.: US 7,278,750 B2
(45) Date of Patent: Oct. 9, 2007

(54) LED KEYBOARD OF A NOTEBOOK COMPUTER

(75) Inventor: Wen-Lung Cheng, Taipei Hsien (TW)

(73) Assignee: Sondyo Computer Co., Ltd., Shi-Chih, Taipei Hsien (TW)

(*) Notice: Subject to any disclaimer, the term of this patent is extended or adjusted under 35 U.S.C. 154(b) by 249 days.

(21) Appl. No.: 11/191,193

(22) Filed: Jul. 28, 2005

(65) Prior Publication Data

US 2007/0025097 A1    Feb. 1, 2007

(51) Int. Cl.
*F21V 33/00* (2006.01)

(52) U.S. Cl. ............................. 362/85; 362/29; 345/170

(58) Field of Classification Search ................. 362/85, 362/555, 24, 29, 577, 800; 345/170
See application file for complete search history.

(56) References Cited

U.S. PATENT DOCUMENTS 6,416,196 B1 * 7/2002 Lemarchand et al. .......... 362/84

| 2002/0101738 | A1 * | 8/2002 | Misaras ...................... 362/487 |
| 2003/0202336 | A1 * | 10/2003 | Ostergard et al. ............. 362/24 |
| 2005/0041019 | A1 * | 2/2005 | King et al. .................. 345/184 |
| 2006/0346065 | * | 2/2006 | Thurk .......................... 362/84 |

\* cited by examiner

*Primary Examiner*—Stephen F. Husar
*Assistant Examiner*—Peggy A. Neils (57) ABSTRACT

An LED keyboard of a notebook computer comprises a plurality of interlaced slots, each having a cluster of retaining holes. Roughly at the center of the cluster of retaining holes, there is a flexible body wherein a light-emitting body is installed. Each of the light-emitting bodies has a set of conducting feet extended thereunder, which is kept at a distance from a base. The base further includes a conducting film and a plurality of retaining rings. A scissored foot set is mounted above within each of the slots, having a key cap mounted on the scissored foot set. Thereby, as the key cap is stroked, the scissored foot set will shift downward and the conducting feet will contact with a copper-foil wire on the conducting film, activating the light-emitting body. As the key cap is not stroked, the flexible body will restore the original configuration.

8 Claims, 9 Drawing Sheets

LED KEYBOARD OF A NOTEBOOK COMPUTER

FIELD OF THE INVENTION

The present invention relates to LED keyboards, more particularly to an LED keyboard of a notebook computer wherein a light-emitting body associated with a key will be brought into electric contact with a conducting film so as to activate the light-emitting body. Therefore, the light-emitting body of a key cap will produce a light of short duration when the key cap is stroked.

BACKGROUND OF THE INVENTION

Figure 1:
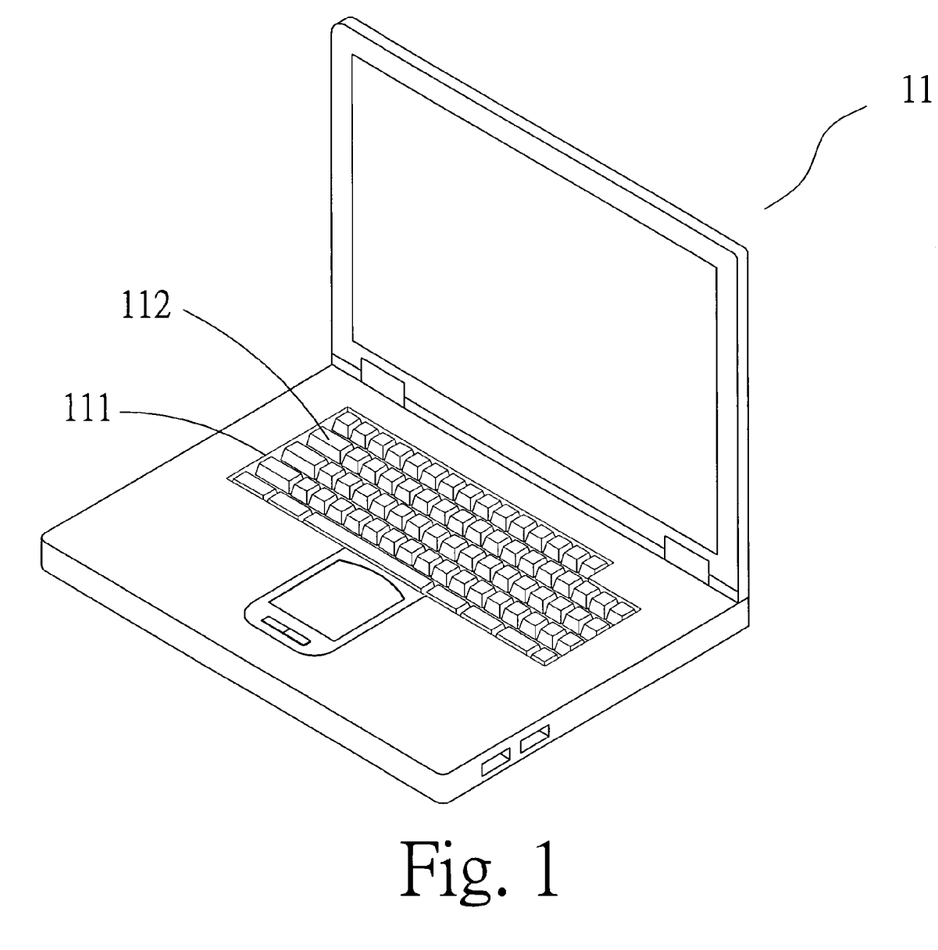
FIG. 1 is a perspective view of a notebook computer of the prior art.
Figure 2:
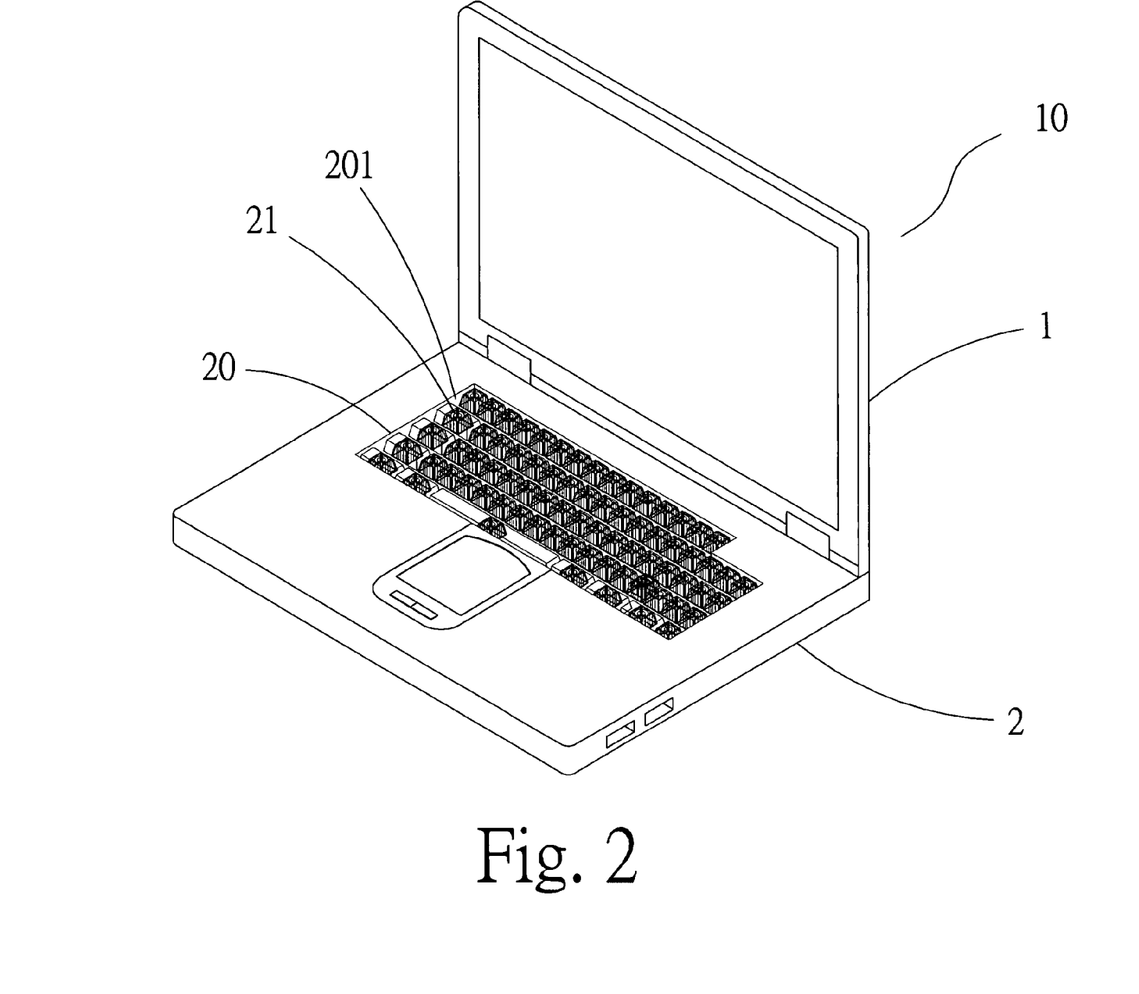
FIG. 2 is a perspective view of an LED keyboard of a notebook computer of the present invention.
Figure 3:
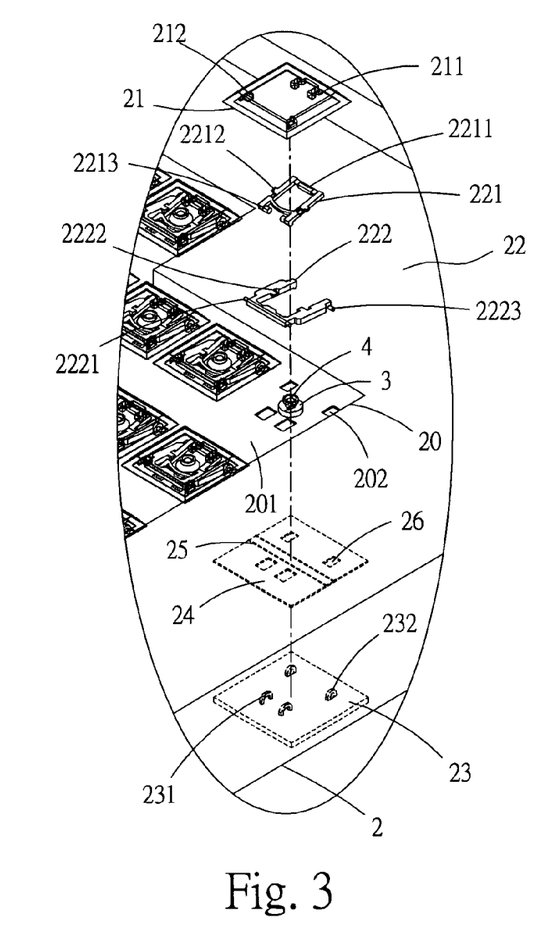
FIG. 3 is an exploded perspective view of the LED keyboard of a notebook computer in FIG. 2.
Figure 4:
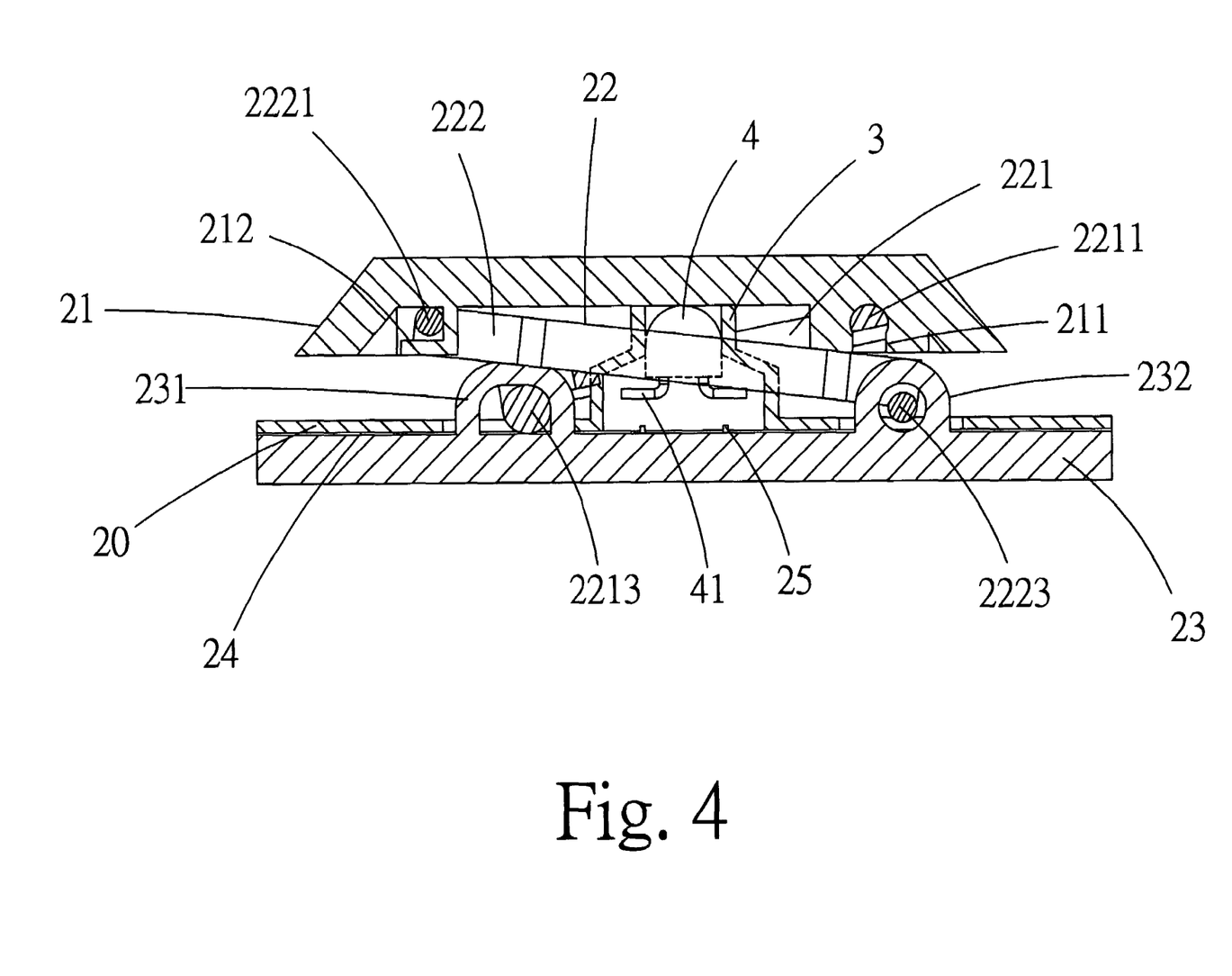
FIG. 4 is a side view of a key of the LED keyboard of a notebook computer in FIG. 2 before the key is a stroke.

Referring to FIG. 1, a notebook computer 11 of the prior art has a plurality of key 112 on a keyboard main body 111. Since the arrangement of the keys 112 associated with a notebook computer 11 has to be compact, the density and the size of the keys 112 are high and small, which contribute to the typing errors committed by a user. On the other hand, a user has to be cautious during a typing process so as to illuminate typos. Therefore, a user will become tired of using a notebook computer 11 after a period of time. And therefore, there will be beneficial that an effect of visual appeal is added to a notebook computer, so that a user will be more motivated to use the computer.

SUMMARY OF THE INVENTION

The primary objective of the present invention is to provide an LED keyboard of a notebook computer comprising a plurality of interlaced slots, each having a cluster of retaining holes. Roughly at the center of the cluster of retaining holes, there is a flexible body wherein a light-emitting body is installed. Each of the light-emitting bodies has a set of conducting feet extended thereunder, which is kept at a distance from a base. The base further includes a conducting film and a plurality of retaining rings. A scissored foot set is mounted above within each of the slots, having a key cap mounted on the scissored foot set. Thereby, as the key cap is stroked, the scissored foot set will shift downward and the conducting feet will contact with a copper-foil wire on the conducting film, activating the light-emitting body. As the key cap is not stroked, the flexible body will restore the original configuration, and the feet of the light-emitting body will depart from the conducting film, thereby the light-emitting body stopping illuminating. Therefore, the light-emitting body of a key cap will produce a light of short duration when the key cap is stroked, producing an effect of visual appeal.

The various objects and advantages of the present invention will be more readily understood from the following detailed description when read in conjunction with the appended drawings.

BRIEF DESCRIPTION OF THE DRAWINGS

FIG. 4-1 is a side view of a key of the LED keyboard of a notebook computer in FIG. 4 during a stroke.

DETAILED DESCRIPTION OF THE PREFERRED EMBODIMENTS

Referring to FIGS. 2, 3, 4 and 4-1, the present invention relates to an LED keyboard of a notebook computer. The notebook computer 10 comprises a screen 1, an LED keyboard 2 in which the key caps 21 are equipped with respective flexible bodies 3 and light-emitting bodies 4. The LED keyboard 2 further includes a keyboard main body 20, interlaced slots 201 and a plurality of uniformly arranged retaining holes 202 within each of the slots 201. Roughly at the center of each set of retaining holes 202, there is a flexible body 3 provided with a light-emitting body 4 therein. Each of the light-emitting bodies 4 is extended with conducting feet 41 from the bottom thereon. The light-emitting bodies 4 are engaged with the inner top walls of respective flexible bodies 3, with its flexible feet 41 held at distance from the inner bottom walls of the cavities defined by the flexible bodies 3. The bottom surfaces of the interlaced slots 201 are provided respectively with conducting films 24. Each of the conducting films 24 is provided with a copper-foil wire 25. The bottom surfaces of the conducting films 24 are each equipped with a base 23; each of the bases 23 is provided with a retaining projections A 231 and a retaining projections B 232, which can go through holes 26 on the conducting films 24 and then engage with the retaining holes 202 within the interlaced slots 201. Thereby, the retaining projections A 231 and the retaining projections B 232 may become retaining mechanisms within the interlaced slots 201. The base 23 and the conducting film 24 are stacked together and located beneath the keyboard main body 20. A scissored foot set 22, consisting of a scissored part A 221 and a scissored part B 222, is mounted above each of the interlaced slots 201. The scissored part A 221 further comprises a pair of projected ears 2212 formed on two lateral sides thereof, and the scissored part B 222 further comprises a pair of recesses 2222 formed on two lateral sides thereof, whereby they can be engaged. Two projected columns 2223 of the scissored part A 221 can be engaged with the retaining projections A 231 of the base 23. Further, the projected columns 2223 of the scissored part B 222 can be engaged with the retaining projections B 232 of the base 23. Thereby, each of the scissored foot sets 22 situates within an associated interlaced slot 201, capable of contracting or stretching to achieve up and down movements. A key cap 21 is mounted on each of the scissored foot sets 22, the lower face of which is provided with uniformly arranged hook part a 211 and hook part b 212. The hook part a 211 can be engaged with a short transverse column 2211 of the scissored part A 221, and the hook part b 212 can be engaged with a long transverse column 2221 of the scissored part B 222, whereby the corresponding screen key cap 21 can shift up and down in an interlaced slot 201 of the keyboard main body 20. The flexible bodies 3 support against respective key caps 21 mounted on the lower inner faces thereof. If one of the key caps 21 is pushed downward, the corresponding flexible body 3 will be compressed and deformed, and the scissored foot set 22 will be collapsed accordingly, whereby the conducting feet 41 under the light-emitting body 4 within the flexible body 3 will move downward to contact the copper-foil wire 25 on the conducting film 24. As the key cap 21 is not pushed, the flexible body 3 will restored to the original configuration and the scissored foot set 22 will be stretched, whereby the conducting feet 41 of the light-emitting body 4 will depart from the copper-foil wire 25 on the conducting film 24. To summarize, the light-emitting body 4 of a key cap 21 will produce a light of short duration when the key cap 21 is stroked.

Figure 5:
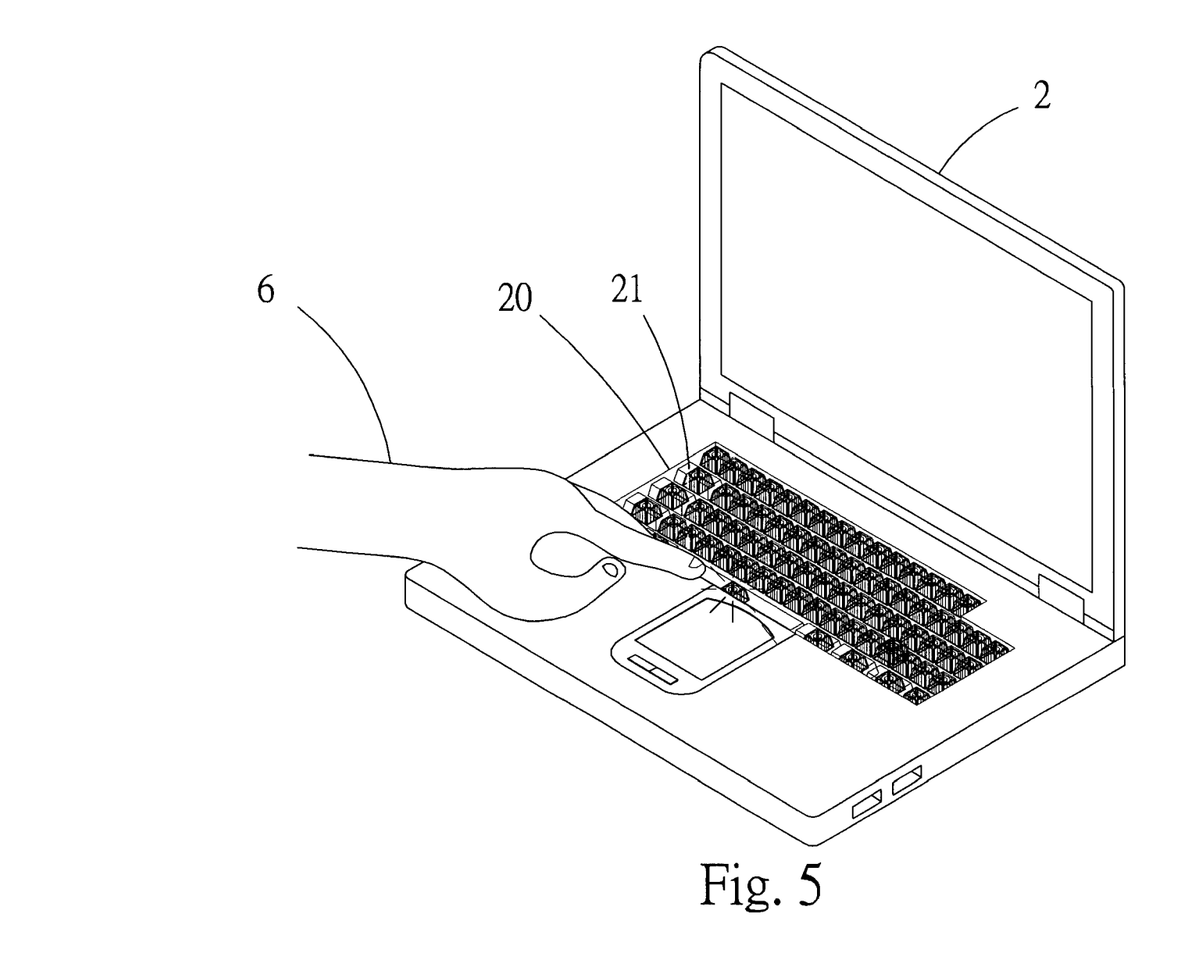
FIG. 5 illustrates the first preferred embodiment of an LED keyboard of a notebook computer of the present invention.

Referring to FIG. 5, it illustrates the first preferred embodiment of the present invention as an LED keyboard of a notebook computer. If a user strokes one of the key caps 21, the corresponding flexible body 3 will be compressed and deformed and the scissored foot set 22 will be collapsed accordingly, whereby the conducting feet 41 under the light-emitting body 4 within the flexible body 3 will move downward to contact the copper-foil wire 25 on the conducting film 24. The electric signals thus produced by the contact of the conducting feet 41 with copper-foil wire 25 will be send to the computer. Further, the light-emitting body 4 will provide a flash of light of short duration. As the key cap 21 is not pushed, the flexible body 3 will restored to the original configuration and therefore the key cap 21 will return to its original location, whereby the conducting feet 41 of the light-emitting body 4 will depart from the copper-foil wire 25 on the conducting film 24. The light-emitting body 4 will stop illuminating.

Figure 6:
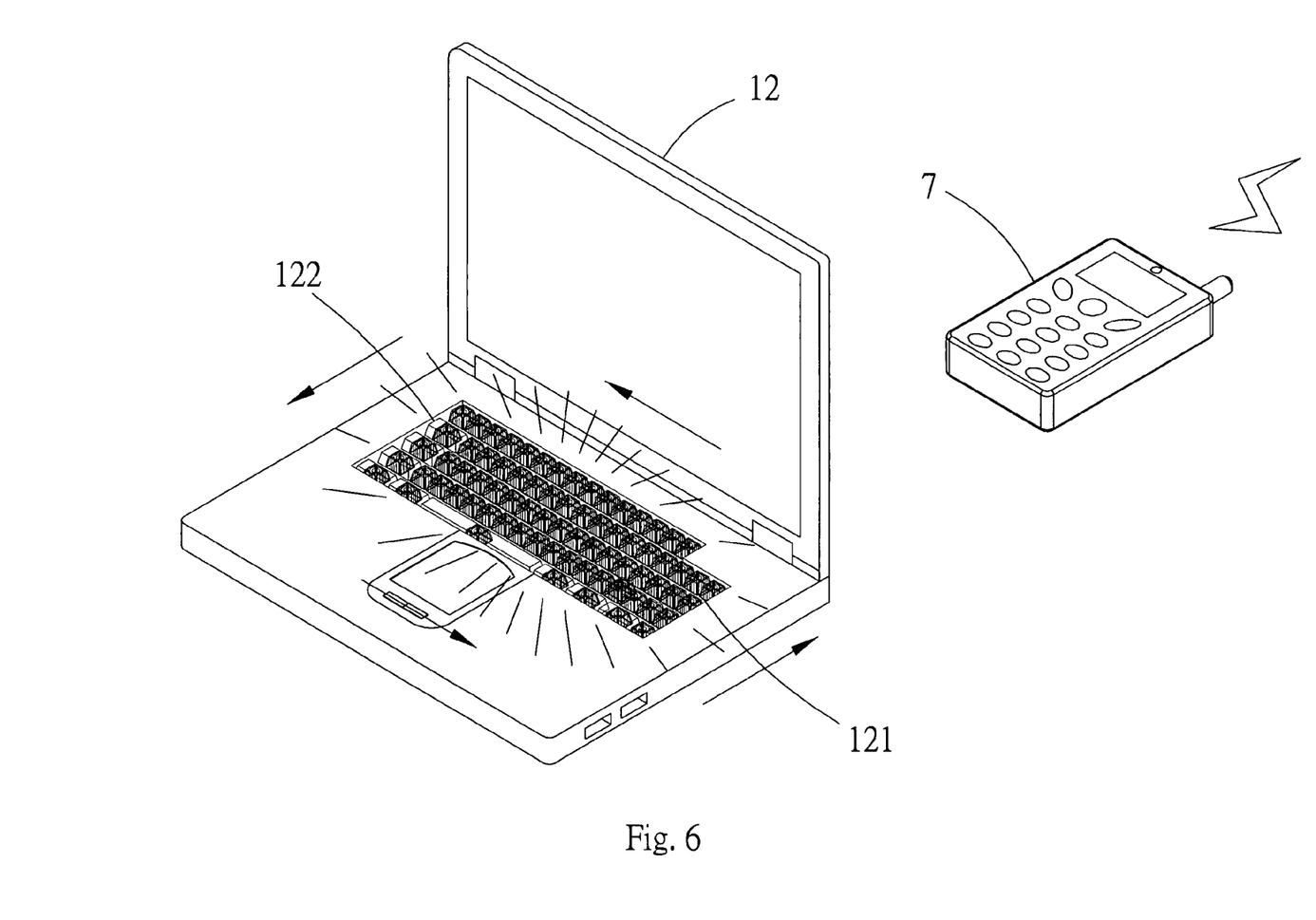
FIG. 6 illustrates the second preferred embodiment of an LED keyboard of a notebook computer of the present invention.

Referring to FIG. 6, it illustrates the second preferred embodiment of the present invention as an LED keyboard of a notebook computer. The key caps 122 of the notebook computer 12 can receive electromagnetic signals from a cell phone, whereby a predetermined group of the key caps 122 or those surrounding the keyboard will illuminate as the cell phone is ringing.

Figure 7:
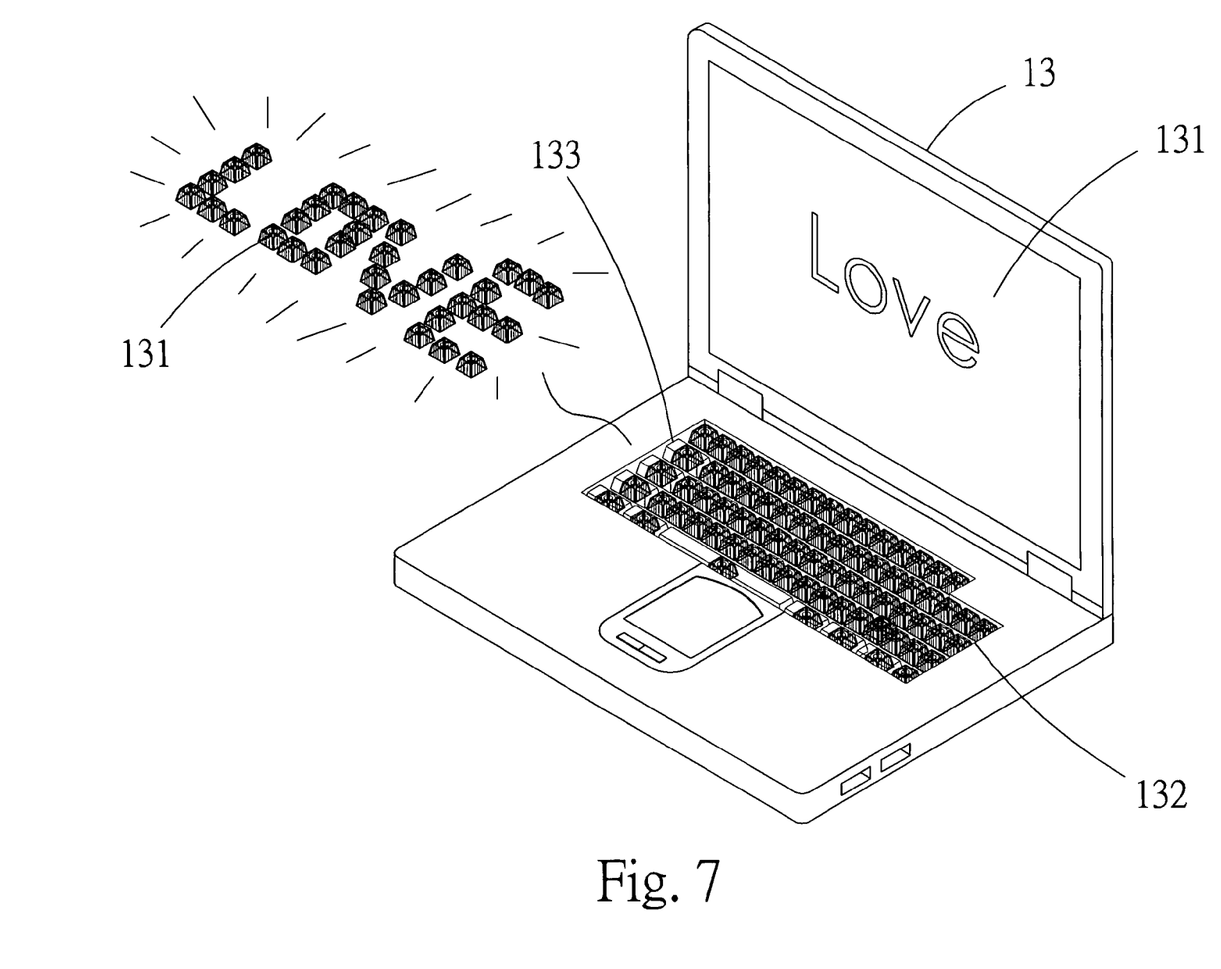
FIG. 7 illustrates the third preferred embodiment of an LED keyboard of a notebook computer of the present invention.

Referring to FIG. 7, it illustrates the third preferred embodiment of the present invention as an LED keyboard of a notebook computer. The key caps 131 of the notebook computer 13 can receive a predetermined signal from the computer and automatically type letters on the computer screen 132, such as "LOVE" in FIG. 7. The corresponding key caps 131 producing those letters will also illuminate continuously, whereby the keyboard 133 carries those key caps 131 will act as a commercial advertisement board, adding extra value to the keyboard 133.

Figure 8:
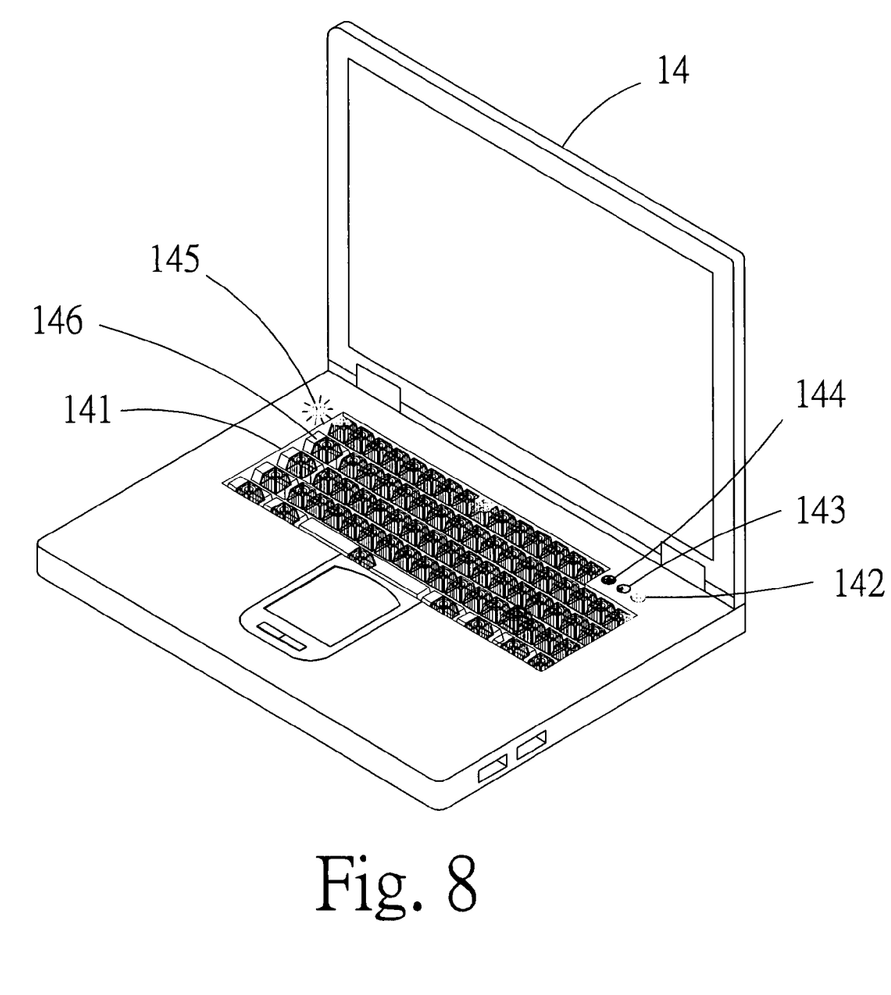
FIG. 8 illustrates the fourth preferred embodiment of an LED keyboard of a notebook computer of the present invention.
Figure 41:
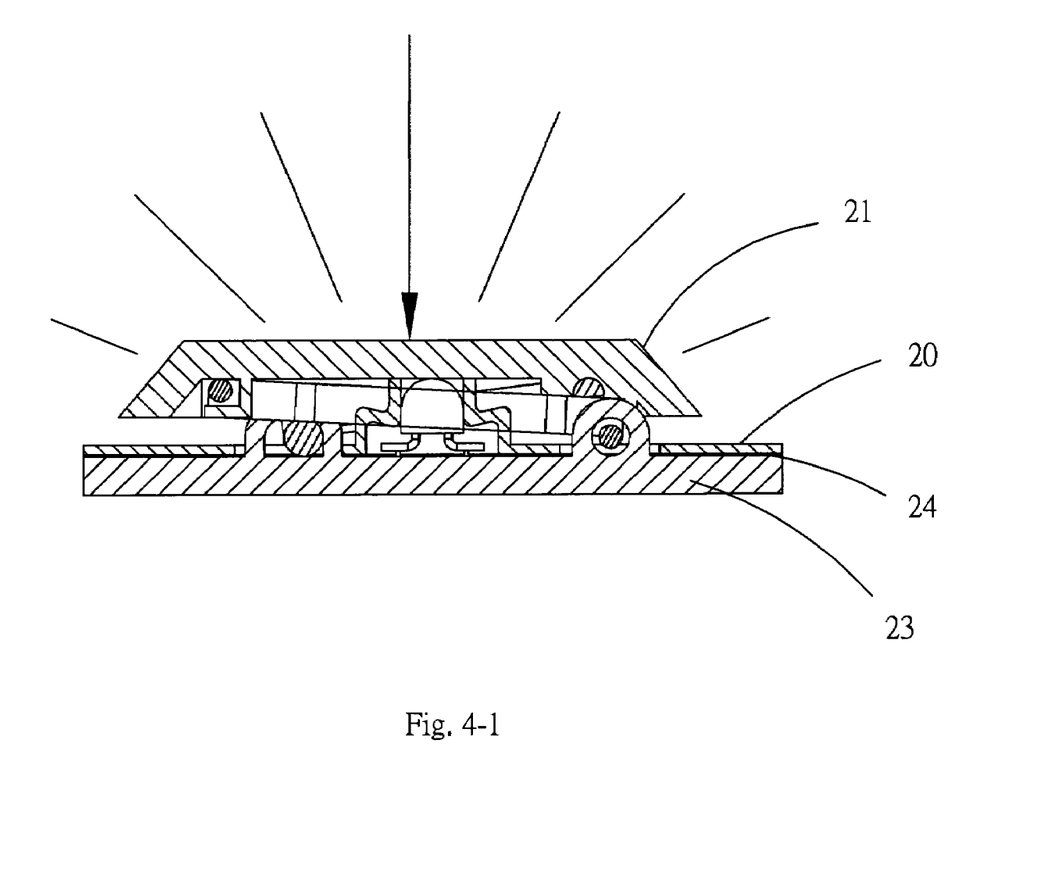

Referring to FIG. 8, it illustrates the fourth preferred embodiment of the present invention as an LED keyboard of a notebook computer. The keyboard main body 141 of the notebook computer 14 is further equipped with a light switch 142, a light-intensity increasing switch 143, a light-intensity decreasing switch 144 and an advertisement pattern switch 145. If the light switch 142 is off, the key caps 146 of the keyboard main body 141 cannot illuminate. The light-intensity increasing switch 143 and the light-intensity decreasing switch 144 can adjust the intensity of the key caps 146. The advertisement pattern switch 145 can control a predetermined group of the key caps 146 to illuminate, whereby an advertising effect will be achieved.

The advantages of the present invention are summarized as follows. 1. The key caps are made of a material pervious to light, therefore showing the intensity of the light-emitting bodies underneath well. 2. The light-emitting bodies are installed within the key caps, therefore producing a catchy visual effect for the key caps. 3. The advertisement pattern switch added to the keyboard can control a predetermined group of the key caps to illuminate, whereby an advertising effect will be achieved. 4. The key caps of the notebook computer can receive a predetermined signal from the computer and show a selected letters on the computer screen. The associated key caps will illuminate continuously, whereby the keyboard will act as a commercial advertisement board, adding extra value to the keyboard. 5. The key caps of the notebook computer can receive electromagnetic signals from a cell phone, whereby a predetermined group of the key caps or those surrounding the keyboard will illuminate as the cell phone is ringing.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An LED keyboard of a notebook computer, comprising:
 a plurality of interlaced slots each having a cluster of retaining holes, a scissored foot set being mount above each said interlaced slots having a key cap mounted thereon;
 a plurality of flexible bodies respectively mounted at a center of corresponding cluster of retaining holes;
 a plurality of light-emitting bodies respectively installed within said flexible bodies, each of said light-emitting bodies having a set of conducting feet; and
 a plurality of bases each located under one said slot having a plurality of retaining ring-shaped projections and a conducting film, each of said light-emitting bodies being kept at a distance from a corresponding base by corresponding flexible body and scissored foot set;
 whereby, as a key cap is stroked, a corresponding one of said scissored foot sets will shift downward and a corresponding conducting feet will contact with a copper-foil wire on a corresponding conducting film, activating a corresponding one of said light-emitting bodies, and whereby, as a key cap is not stroked, a corresponding flexible body will restore its original configuration, and the feet of a corresponding light-emitting body will again depart from a corresponding conducting film so that a corresponding one of said light-emitting body stopping illuminating.

2. The LED keyboard of a notebook computer of claim 1 wherein said key caps and said flexible bodies are made of a transparent material.

3. The LED keyboard of a notebook computer of claim 1 wherein each of light-emitting bodies is attached to a top inner face of a corresponding said flexible body; said conducting feet of said light-emitting bodies being held at a distance to a bottom end of each of said flexible bodies, whereby said conducting feet will not contact with said copper-foil wires on said based.

4. The LED keyboard of a notebook computer of claim 1 wherein said scissored foot sets between said bases and said flexible bodies are each capable of moving up and down, facilitating said light-emitting bodies moving accordingly within said flexible bodies.

5. The LED keyboard of a notebook computer of claim 1 wherein said light-emitting bodies are controlled by a light-intensity switch to turn on or shut off the light of said light-emitting bodies.

6. The LED keyboard of a notebook computer of claim 1 wherein said key caps receives the electromagnetic signal of an incoming call from a cell phone, whereby a user can be reminded of said incoming call of said cell phone.

7. The LED keyboard of a notebook computer of claim 1 wherein said key caps of said notebook computer can receive a signal from said notebook computer.

8. The LED keyboard of a notebook computer of claim 1 wherein a keyboard carrying said key caps is further provided with a light switch, a light-intensity increasing switch, a light-intensity decreasing switch and an advertisement pattern switch.

* * * * *